Oct. 6, 1931.   P. L. TENNEY   1,826,407
TRANSMISSION SHIFTING MECHANISM
Filed Dec. 13, 1926   2 Sheets-Sheet 1

Inventor
Perry L. Tenney
By Blackmore, Spencer & Hiel
Attorneys

Oct. 6, 1931.           P. L. TENNEY                1,826,407
                 TRANSMISSION SHIFTING MECHANISM
                   Filed Dec. 13, 1926        2 Sheets-Sheet 2
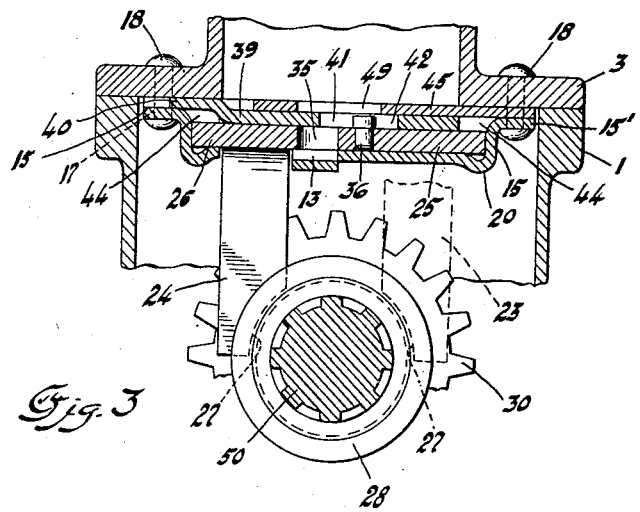
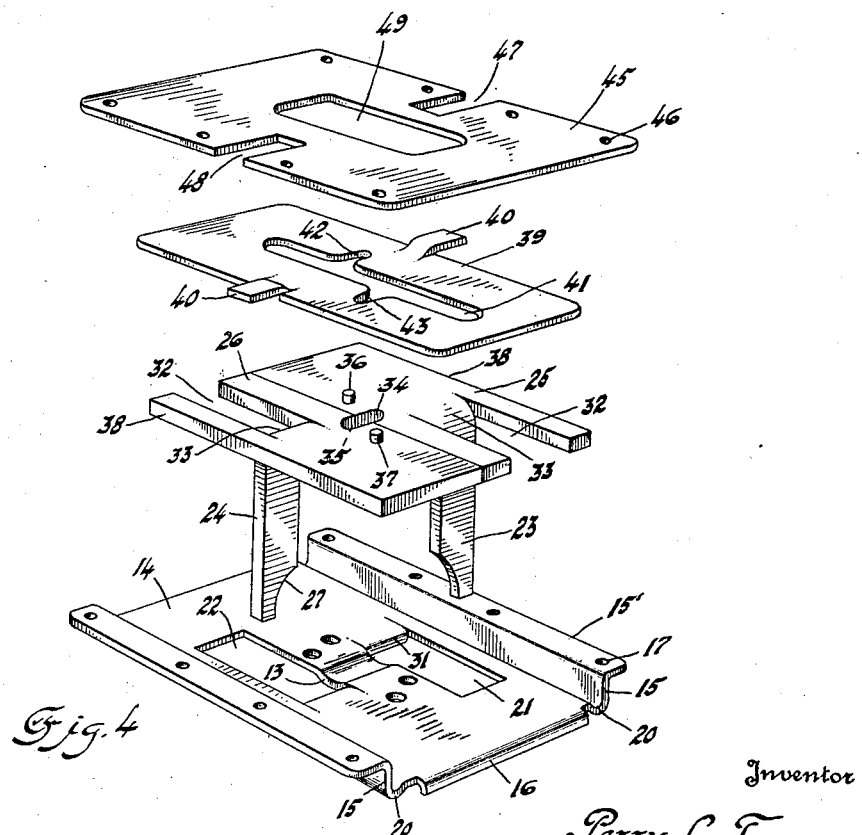
Inventor
Perry L. Tenney
By Blackmore, Spencer & Hulh
Attorneys Patented Oct. 6, 1931

1,826,407

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

TRANSMISSION SHIFTING MECHANISM

Application filed December 13, 1926. Serial No. 154,483.

This invention relates to transmissions as applied to motor vehicles and particularly to the gear shifting mechanism thereof.

In gear shifting mechanisms use has been made of a smooth machined undersurface on the transmission cover over which the interlock plate could slide, but this structure necessitated some expense in the way of manufacturing costs and it is the object of my invention to produce a transmission shifting mechanism in which the machining of the cover plate is eliminated and cost of production decreased. I accomplish this object by providing a separate metal stamping between the transmission cover and the supporting plate and bolt this stamping to both cover and supporting plate. Between the plate and the stamping are to be found the shifter table and the shifting forks for operating the gears of the transmission. By the use of my new structure the transmission cover casing is simplified.

The gear shifting lever of my invention has a ball shaped end and is under spring pressure at all times and is therefore prevented from rattling which has been an objection on prior constructions.

The invention is disclosed in the accompanying drawings in which,

Figure 3 is a detailed sectional view through a shifting mechanism on the line 3—3 of Figure 2.

Figure 4 is a perspective view of various parts of my invention showing in separated relation but in their relative positions.

Figure 1:
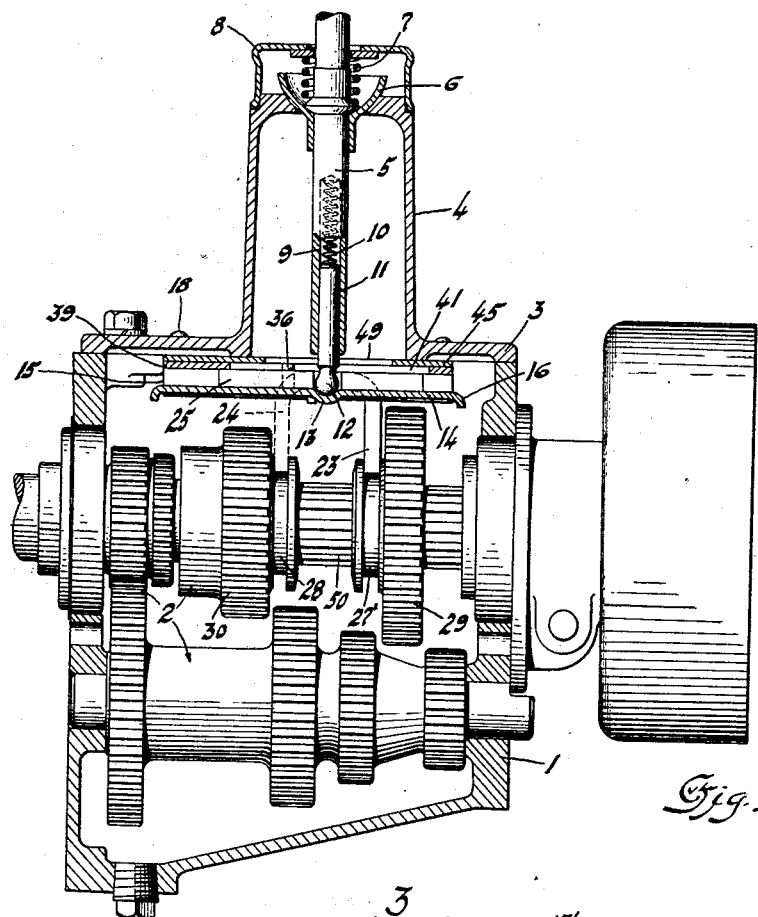
Figure 1 is a sectional view of the transmission showing my invention applied thereto.
Figure 2:
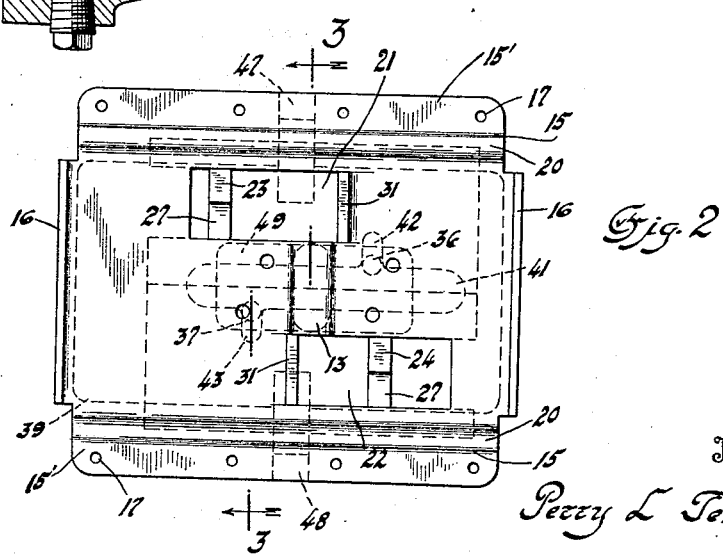
Figure 2 is a view of the parts of my shifter mechanism looking from the bottom.

The transmission housing is shown at 1 in which is contained the usual speed gearing 2, enclosed by the cover 3 of the transmission housing. The cover has an upright hollow housing 4 into which projects the lower end of the shifting lever 5, seated by a ball and socket joint 6 at the top of the housing and which is forced downward by a spring 7 confined between the joint 6 and a cap 8 at the upper end of the housing 4. The shifting lever has a hollow end portion 9 in which is seated a spring 10 which acts on a plunger 11 fitted within the hollow end portion. The lower end of the plunger is ball shaped as shown at 12 and rests in a trough 13 on the supporting plate 14.

The plate 14 has upturned flanges 15 at its sides and downturned flanges 16 at its ends and the flanges 15 are in turn bent at right angles as shown at 15' and provided with openings 17 for the reception of bolts or rivets 18 by means of which it is secured to the cover 3. Adjacent each flange 15 the supporting plate is provided with a channel 20 and on opposite sides of its longitudinal centre line with oppositely directed slots or openings 21 and 22 for the reception of the shifter tongues 23 and 24 of the shifter forks 25 and 26 respectively. These shifter forks have arcuate portions 27 at their lower ends for reception within collars 27' and 28 on the low and high gears 29 and 30, respectively. The inner ends of the slots 21 and 22 are provided with downturned flanges 31 and the trough 13 is shown in Figure 4 as connecting the slots 21 and 22 at their inner ends.

The forks 25 and 26 have their shifter tongues integral therewith and formed by downwardly bending as at 33, a cut-out portion of the body of a fork, leaving a recess 32 extending inwardly from the opposite edges to approximately the centre of each fork. The inner abutting edges of the body portions of the forks are provided with slots or recesses, numeral 34 indicating the recesses of fork 25 and numeral 35 the recess of fork 26, and projecting upwardly from the body of the fork 25 is a stud 36 while a stud 37 similarly projects from the body of fork 26.

When the shifter forks are placed in their proper abutting position on the supporting plate the shifter tongues will project through the openings 21 and 22 and their outer edges 38 will be confined between the flanges 15 of the supporting plate which construction will permit of a shifting of the forks in a longitudinal direction but not transversely. After the insertion of the tongues through openings 21 and 22 they will mesh with the corresponding collar on the low and high transmission gears.

Mounted on the forks 25 and 26 is a shifter table 39 of general rectangular contour but having the upwardly bent tongues 40 projecting centrally outwardly from either side. The longitudinal centre of the shifter plate has a comparatively narrow elongated slot 41 having opening thereinto from opposite sides two similar longitudinally spaced lateral slots or recesses 42 and 43 for the reception of studs or pins 36 and 37, respectively, of the shifting forks. When the forks are in their neutral position the slots 42 and 43 are so spaced that by shifting the table 39 to either side, one of the slots 42 or 43 will embrace its corresponding stud 36 or 37 while the other will be removed therefrom. The breadth of the plate 39 is less than the two abutting forks 25 and 26 as is shown by the space 44 in Figure 3. This difference in width is for the purpose of allowing the shifter table to be moved transversely of the forks but the structure is such that no longitudinal movement will be allowed as will be later described.

Mounted over the shifter table 39 is a stamping 45 of general rectangular contour. This stamping is provided with bolt openings 46 corresponding to the opening 17 on the supporting plate 14 and with recesses 47 and 48 centrally of its sides, and a broad longitudinal slot 49 at its centre. The stamping 45 is secured to the transmission cover and the supporting plate by means of bolts 18 and forms a spacer member between the supporting plate 14 and the cover 3. The slots 47 and 48 are for the reception of the tongues 40 of the shifter table 39 and they are of sufficient depth to allow for the shifting of the table from side to side over the forks to engage either of the studs 36 or 37 into its corresponding slot 42 or 43.

The slots 34—35, 41 and 49 coincide, with slot 49 substantially twice the width of either slot 41 or the combined slot 34—35, and the latter is at least twice the width of the ball 13 of the plunger 11. This plunger 11 projects through all of the slots and has the ball portion thereof seated in the combined slot 34—35 and rests in the trough 13 of the supporting plate 14 and a continuous downward pressure is exerted thereon by the spring 10.

The operation of the device is as follows:—
Assuming the parts of Figure 4 to be in assembled relation, the plunger will project through slots 49 and 41 and into either of the recesses 34 or 35. If the shifter table 39 is in its central position both of the studs 36—37 will be engaged in the slots 42 or 43 and as the table 39 cannot be moved longitudinally, the stud and slot connection will prevent any shifting of the forks. Now if the lower end of the lever 5 is shifted to the right giving the position of the parts as shown in Figure 3, the table 39 will also be shifted and cause the stud 36 of the fork 25 to leave the slot 42, and the slot 43 to further surround the stud 37 of the fork 26. The slot 41 is now coincident with the right side of the slot 49, ball 12 of the plunger 11 is seated in the slot 34, and the stud 36 is in the path of the slot 41. The lever 5 is now free from obstruction and by shifting it at right angles to its original movement it will carry along with it the fork 25 by means of the ball and slot connection 13, 34, and by means of the shifter tongue 23, will shift the gear 29 longitudinally of the shaft 50.

After the above operation any further shifting of the lever 5 must be in the reverse direction which will throw out the gear 29 and by then throwing the lever to the left the fork 25 will be disengaged and the fork 26 engaged. The fork 26 may now be moved to bring its gear 30 into engagement by shifting the lever 5 in the direction of the slots 41 and 49.

It will of course be understood that the forks 25 or 26 will be prevented from being shifted in one longitudinal direction by the tongues 23 or 24 coming in contact with the flanges 31 at the end of the slots 21 or 22.

Having described my invention what I claim is new is:—

1. In a gear shifting mechanism in combination with a transmission housing, a supporting member for the mechanism, shifter devices supported by said member, a shiftable table overlying said shifter devices, said table having recesses, projecting studs on said devices for engagement in said recesses to permit the movement of only one of said devices at a time, means for securing said member to the transmission housing, and means for moving said table and selectively moving said devices.

2. In a gear shifting mechanism in combination with a transmission housing, a supporting member for the mechanism, shifter devices supported by said member, a shiftable table overlying said shifter devices, means for controlling the shifting movement of said table, said table having a longitudinal slot with lateral slots opening thereinto, means on said shifter devices adapted to engage in said lateral slots to permit the movement of only one of said devices at a time, means for securing said member to the transmission housing, and means passing through said longitudinal slot to move said table and selectively move said devices.

3. In a gear shifting mechanism in combination with a transmission housing, a supporting member for the mechanism, shifter devices supported by said member, a shiftable table overlying said shifter devices, means on said devices engaging said table, said means and table locking all or all but one of said devices at one time, said mechanism having a part guiding said table, said part having slots, said table having projecting tongues in engagement with slots in said part to guide said table in its shifting movement, means for securing said member to the transmission housing, and means for moving said table and selectively operating said devices.

4. In a gear shifting mechanism in combination with a transmission housing, a supporting member for the mechanism, shifter devices supported by said member, a shiftable table overlying said shifter devices, means on said devices engaging said table, said means and table locking all or all but one of said devices at one time, said mechanism having a part guiding said table, said table having projecting tongues in engagement with slots in said part to permit movement of said table in but one direction, means for securing said member to the transmission housing, and means for shifting said table and selectively moving said devices.

5. In a gear shifting mechanism in combination with a transmission housing, a supporting member for the mechanism, shifter devices supported by said member, a movable table overlying said shifter devices, projecting studs on said devices, said table having a longitudinal slot with lateral slots opening thereinto, said studs adapted to be received in said lateral slots to permit movement of but one of said devices at a time, said mechanism having a part guiding said table, means for securing said mechanism to the transmission housing, and means for moving said table and said devices.

6. In a gear shifting mechanism in combination with a transmission housing, a supporting member for the mechanism, shifter devices supported by said member, a movable table overlying said shifter devices, means interengaging said table and devices to permit movement of but one of said devices at a time, said mechanism having a part guiding said table, said part having a central slot, means for securing said member in the transmission housing, and means passing through said slot and into said housing for moving said table and selectively operating said devices.

7. In a gear shifting mechanism in combination with a transmission housing, a supporting member for the mechanism, shifter devices supported by said member, a movable table having recesses, means on said shifter devices receivable in said recesses and adapted to permit the movement of but one of said devices at a time, said mechanism having a part guiding said table, means for securing said member to the transmission housing, and means for moving said table and said devices, said part, table, and devices having superimposed slots for the reception of the moving means.

8. In a gear shifting mechanism in combination with a transmission housing, a supporting member for the mechanism, shifter devices supported by said member, a table having recesses, means on said shifter devices receivable in said recesses and adapted to permit the movement of but one of said devices at a time, means for securing said member to the transmission housing, means for moving said table and said devices, and a ball shaped spring pressed end on said moving means seated on said supporting member and engaging said table and devices to move the same.

9. In a gear shifting mechanism in combination with a transmission housing, a supporting member for the mechanism, shifter devices supported by said member, a movable table having recesses, means on said shifter devices receivable in said recesses and adapted to permit the movement of but one of said devices at a time, said table and devices being relatively movable, said mechanism having a part guiding said table, means for securing said member in the transmission housing, and means associated with said housing for moving said devices.

10. In a gear shifting mechanism in combination with a transmission housing, a supporting member for the mechanism, shifter devices supported by said member, a table having recesses, means on said shifter devices receivable in said recesses and adapted to permit the movement of but one of said devices at a time, said mechanism having a part guiding said table, said table and devices being movable relative to said supporting member and said part, means for securing said member to the transmission housing, and a manually operable member extending into the transmission housing and directly engaging said table and devices to shift the table and selectively move the devices.

11. In a gear shifting mechanism in combination with a transmission housing, a supporting member for the mechanism, shifter devices supported by said member, a table having recesses, means on said shifter devices receivable in said recesses and adapted to permit the movement of but one of said devices at a time, said mechanism having a part guiding said table, means for securing said member to the transmission housing, means for moving said table and said devices, and flanges on said supporting member to prevent movement of said devices in one direction.

12. In a gear shifting mechanism in combination with a transmission housing, a supporting plate for the mechanism, shifter forks supported by said member, a table having recesses, means on said shifter devices receivable in said recesses and adapted to permit the movement of but one of said devices at a time, said mechanism having a stamping guiding said table, means for securing said plate to the transmission housing, and means for selectively moving said table and devices.

13. In combination with a transmission housing, a gear shifting mechanism comprising a supporting member for said mechanism, shifter devices supported by said member, a movable table overlying said shifter devices, means interengaging said table and devices and adapted to hold one of the devices from movement while the other one is moved, an element overlying said table and controlling its movement, means passing through said member and element for securing said member in said housing, and means for shifting said table and devices.

14. In a gear shifting mechanism, in combination with a transmission housing, a supporting plate having lateral flanges defining a channel, a plurality of shifter devices supported in said channel, a shiftable table supported over said shifter devices, means interengaging said table with said shifter devices to control said devices in said channel, a member overlying said table and flanges and controlling the movement of said table, means for securing said flanges, member and housing together, and means for shifting said table and devices.

15. In a gear shifting mechanism, in combination with a transmission housing, a supporting element having openings, a plurality of shifter devices resting on said element and having portions projecting through said openings, a shifter table overlying said devices, means interengaging said table with said devices to control the movement thereof, means interposed between the mechanism and housing for controlling the movement of said table, means for securing said element in the housing, and means for shifting said table and devices.

16. In a gear shifting mechanism in combination with a transmission housing, a supporting plate having flanges defining a channel, said channel having openings, a plurality of shifter devices positioned within said channel and having portions extending through said openings to engage with the transmission, a shiftable table overlying said devices, means interengaging said table with said devices to control the movement thereof, a plate controlling the movement of said table, means for securing said plate in the housing, and means extending through openings in said plate and table to engage said shifter devices to move the same.

17. In a gear shifting mechanism in combination with a transmission housing, a supporting member for the mechanism, shifter devices supported by said member, a movable table overlying said shifter devices, means on said devices engaging said table, said means and table locking all or all but one of said devices at one time, said mechanism having a part guiding said table, means for securing said member to the transmission housing inside the same, and a manually operable member extending into the transmission housing and directly engaging said table and devices to shift the table and selectively move the devices.

18. In a gear shifting mechanism in combination with a transmission housing, a plate having a plurality of openings and supporting the mechanism, shifter devices supported by said plate and in said openings, a movable table overlying said shifter devices, means on said devices engaging said table, said means and table locking all or all but one of said devices at one time, means for securing said plate to the transmission housing inside the same, and a manually operable member extending into the transmission housing and directly engaging said table and devices to shift the table and selectively move said devices.

19. In a gear shifting mechanism in combination with a transmission housing, a supporting member for the mechanism, shifter devices supported by said member, said devices having shifter tongues projecting through openings in said member, a movable table overlying said shifter devices, means on said devices engaging said table, said means and table locking all or all but one of said devices at one time, means for securing said member to the transmission housing inside the same, and a manually operable member extending into the transmission housing and directly engaging said table and devices to shift the table and selectively move said devices.

20. In a gear shifting mechanism in combination with a transmission housing, a supporting member for the mechanism, shifter devices supported by said member, a shiftable table overlying said shifter devices, means on said devices engaging said table, said means and table locking all or all but one of said devices at one time, said mechanism having a part guiding said table, means for securing said member to the transmission housing inside the same, and a manually operable member extending into the transmission housing and directly engaging said table and devices to shift the table and selectively move said devices.

21. In a gear shifting mechanism in combination with a transmission housing, a supporting member for the mechanism, shifter devices supported by said member, a movable table overlying said shifter devices, means in said mechanism permitting lateral but not longitudinal movement of said table, means on said devices engaging said table, said means and table locking all or all but one of said devices at one time, said mechanism having a part guiding said table, means for securing said member to the transmission housing inside the same, and a manually operable member extending into the transmission housing and directly engaging said table and devices to shift the table and selectively move said devices.

22. In a gear shifting mechanism in combination with a transmission housing, a supporting member for the mechanism, shifter devices supported by said member, shifter tongues on said devices comprising portions pressed from the body of the devices, said tongues passing through openings in said member, a movable table overlying said shifter devices, means on said devices engaging said table, said means and table locking all or all but one of said devices at one time, means for securing said member to the transmission housing inside the same, and a manually operable member extending into the transmission housing and directly engaging said table and devices to shift the table and selectively move said devices.

In testimony whereof I affix my signature.

PERRY L. TENNEY.